(No Model.)

R. LONG.
ROAD GRADING MACHINE.

No. 312,480. Patented Feb. 17, 1885.

WITNESSES:
Phil C. Masi.
E. H. Bates

INVENTOR
Richard Long
BY Anderson & Smith
his ATTORNEYS

United States Patent Office.

RICHARD LONG, OF IOWA CITY, IOWA, ASSIGNOR OF ONE-HALF TO S. D. PRYCE, OF SAME PLACE.

ROAD-GRADING MACHINE.

SPECIFICATION forming part of Letters Patent No. 312,480, dated February 17, 1885.

Application filed September 13, 1884. (No model.)

*To all whom it may concern:*

Be it known that I, RICHARD LONG, a citizen of the United States, residing at Iowa City, in the county of Johnson and State of Iowa, have invented certain new and useful Improvements in Road-Grading Machines; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
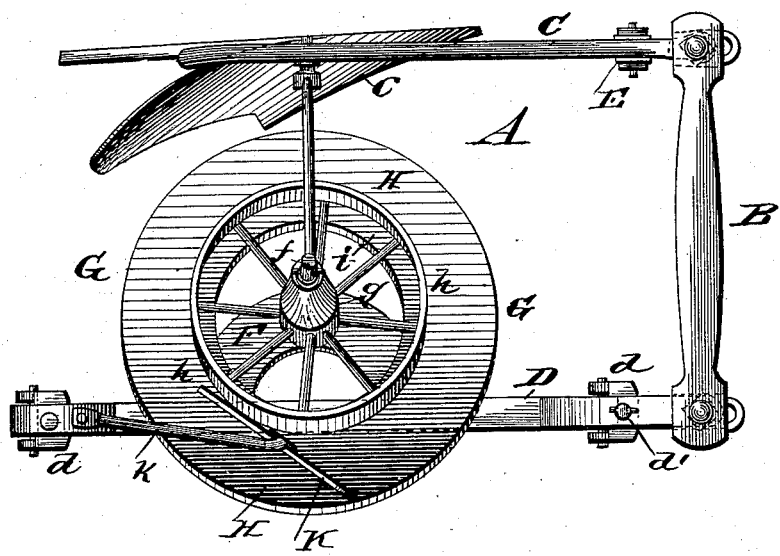
Figure 2:
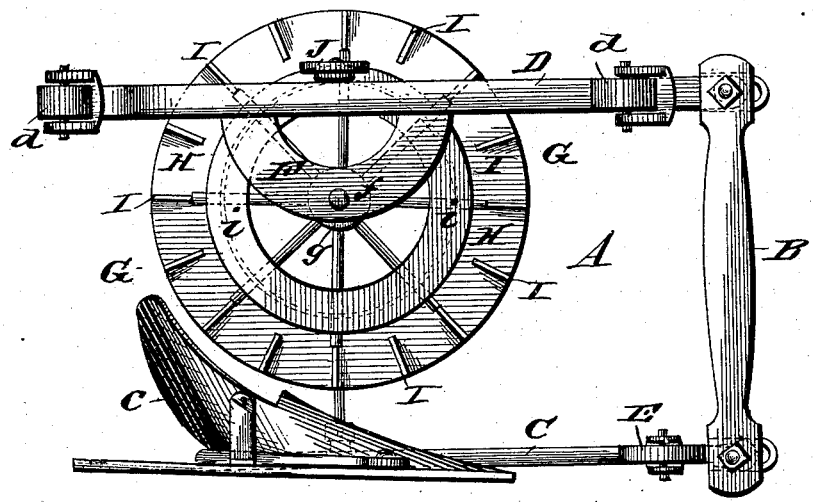
Figure 3:
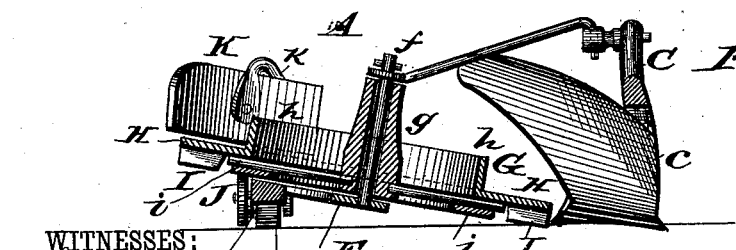

Figure 1 of the drawings is a plan view of my device. Fig. 2 is a bottom view of the same, and Fig. 3 is a vertical sectional view.

The invention relates to road-grading machines; and its object is to carry the dirt turned up by the plow (forming part of the machine) and deposit it uniformly in the center of the road, forming thereby ditches on each side for the purpose of drainage.

The construction of the machine is generally as follows: A plow and a rotating disk are both attached to a frame of proper construction, which has small wheels turning in bearings fixed to it at suitable points, so as to make it roll easily. The plow cuts a furrow and throws up the earth upon the rotating upper surface of the disk, which is pivoted at a convenient point upon the frame, and inclines slightly downward where its edge is opposite the plow, to receive the earth readily from the latter. At a point of the disk opposite the plow an upright scraping-board is arranged across its edge tangentially to a flange around the central opening of the disk, by which means the earth is thrown off the machine into the center of the road.

Certain details of construction of which the invention partially consists are hereinafter fully described.

In the accompanying drawings, A represents the frame to which both the plow and rotating disk are attached, composed of the front transverse beam or draw beam, B, and the lateral beams C and D, running backward at right angles to the same.

C is the plow-beam, having the plowshare $c$ firmly secured to its rear end, as shown. The front end of the plow-beam is flattened horizontally and passes into a horizontal slot or recess in the meeting end of the beam B, being secured therein by means of a rod or bolt, which passes through vertical openings in the said end and the flattened end of the plow-beam, and has a nut screwed on its lower end, thus forming a joint which allows of free lateral motion, and has a certain amount of vertical motion to accommodate the motion of the plowshare.

E is a roller turning in bearings in the lower end of a rod depending from the plow-beam a short distance to the rear of the joint between the latter and the beam B. The said roller aids in supporting the plow-beam and directing the motion of the share $c$.

D is the lateral beam with which the rotating disk is connected. The said beam has its front end flattened and attached to the beam B, similarly to the front end of the plow-beam, but at the opposite end of the former, as shown. The beam D is supported and runs on the end rollers, $d\ d$, the rear roller turning in bearings fixed to the under surface of the beam, and the roller near the front end having its bearings made in one piece and pivoted by a vertical rod, $d'$, to the beam.

F is a semicircular slightly downwardly-inclining offset from the beam D, standing inward from near the center of the same, and secured by having its ends bolted to the upper surface thereof.

$f$ is a rod rising at right angles from the middle point of the offset F, and serving as a pivot upon which the rotating disk G turns. The disk G is composed of a central hub, $g$, bored vertically and turning upon the rod $f$, and a circumferential circular plate, H, concentric with the hub, and joined thereto by proper arms or spokes, as shown.

$h$ is a flange rising at right angles from the inner edge of the plate H, to prevent the earth from being thrown into its central opening.

I I are radial traction flanges or spurs on the under surface of the plate H, to assist in causing the disk to rotate, and $i$ is a circular hoop or plate around the central opening of the disk on the lower surface thereof, against which plate the periphery of the supporting-roller J bears, holding the disk in its proper inclined position, and allowing it turn to easily. The said rollers have their bearings attached to the offset F, as shown.

K is a scraper standing across the plate H tangentially to the side of the flange *h*. The plate K is held in position by the rod *k*, the rear end of which is firmly secured to the beam D, near the rear end of the same.

When the machine is drawn forward, the plow cuts a furrow and throws the earth upon the adjacent lower edge of the disk, which edge turns in the adjoining furrow. The radial flanges I, when the disk moves forward with the machine, impinge upon the ground and cause the disk to radiate on its pivot-point, thus carrying the earth on the plate H backward and around to the scraper, which rakes it off to the rear of the machine and toward the center of the road. The action is repeated until the ditches are sufficiently deep and the grade in the center of the road sufficiently high.

Having thus described my invention, what I claim as new, and desire to secure by Letters Patent, is—

In a road-grading machine, the combination, with the rotating disk G and lateral beam D, of the offset F, rod or spindle *f*, plate *i*, and supporting-roller J, substantially as specified.

In testimony whereof I affix my signature in presence of two witnesses.

RICHARD LONG.

Witnesses:
 TH. F. FREEMAN,
 ALBERT HEMMER.